May 16, 1967  S. J. ANDREASEN ET AL  3,319,775
PORTABLE ELEVATOR CONVEYERS FOR USE WITH TRUCKS
Filed May 14, 1965  2 Sheets-Sheet 1
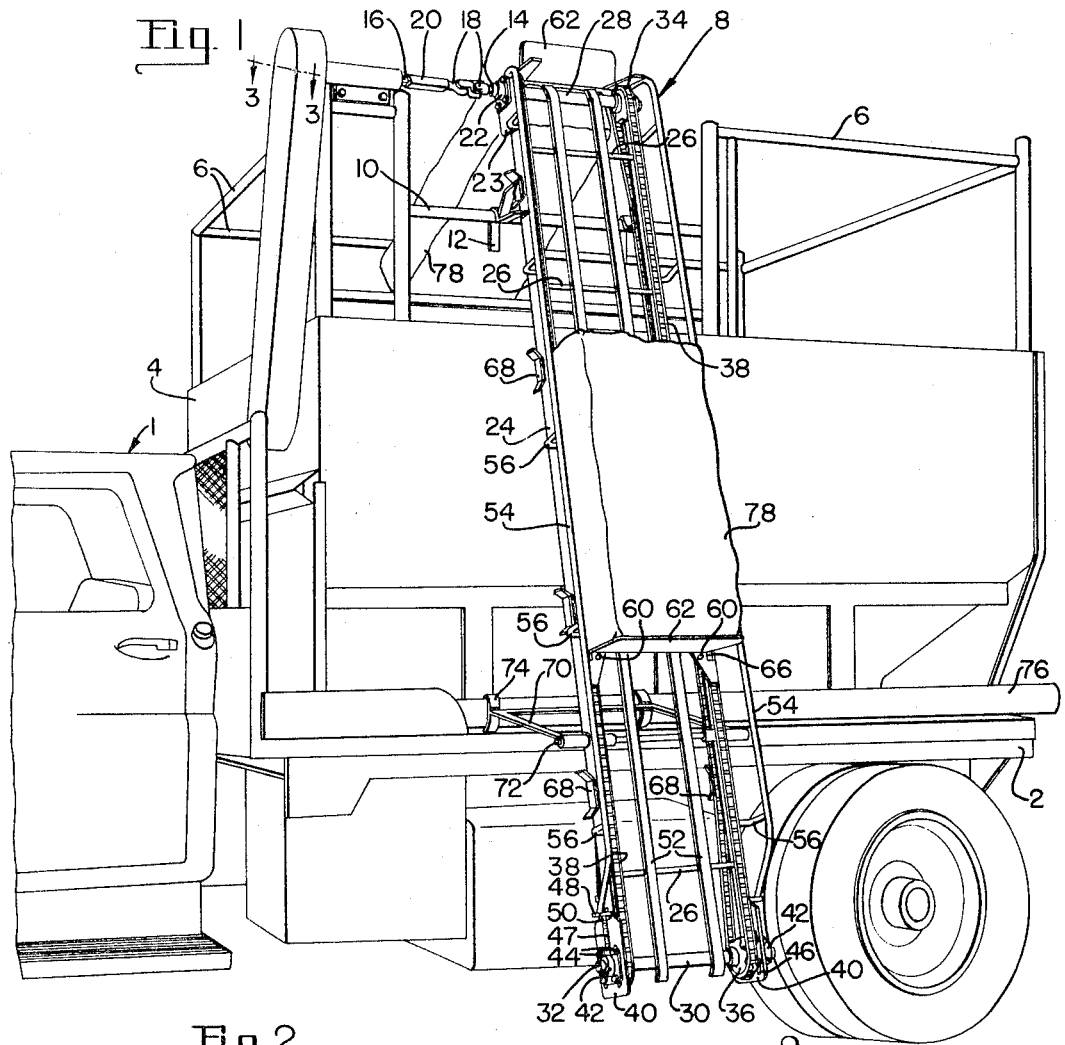
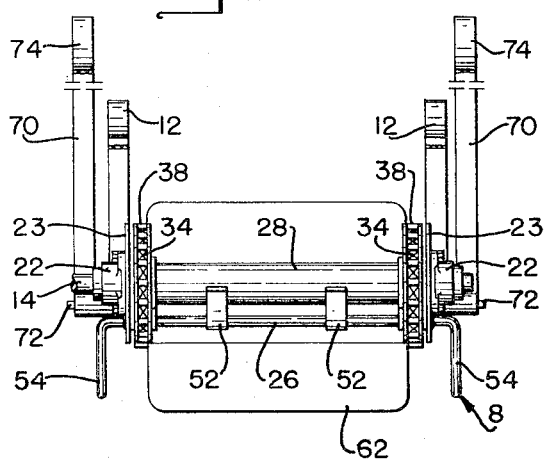
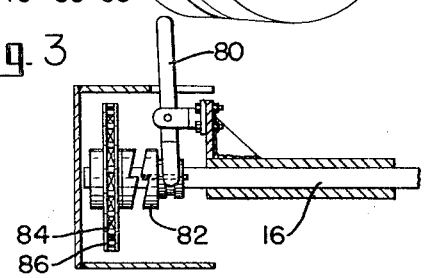
OWEN A. MEYER
SEGURD J. ANDREASEN
INVENTOR.
BY
Wayland D. Keith
THEIR AGENT

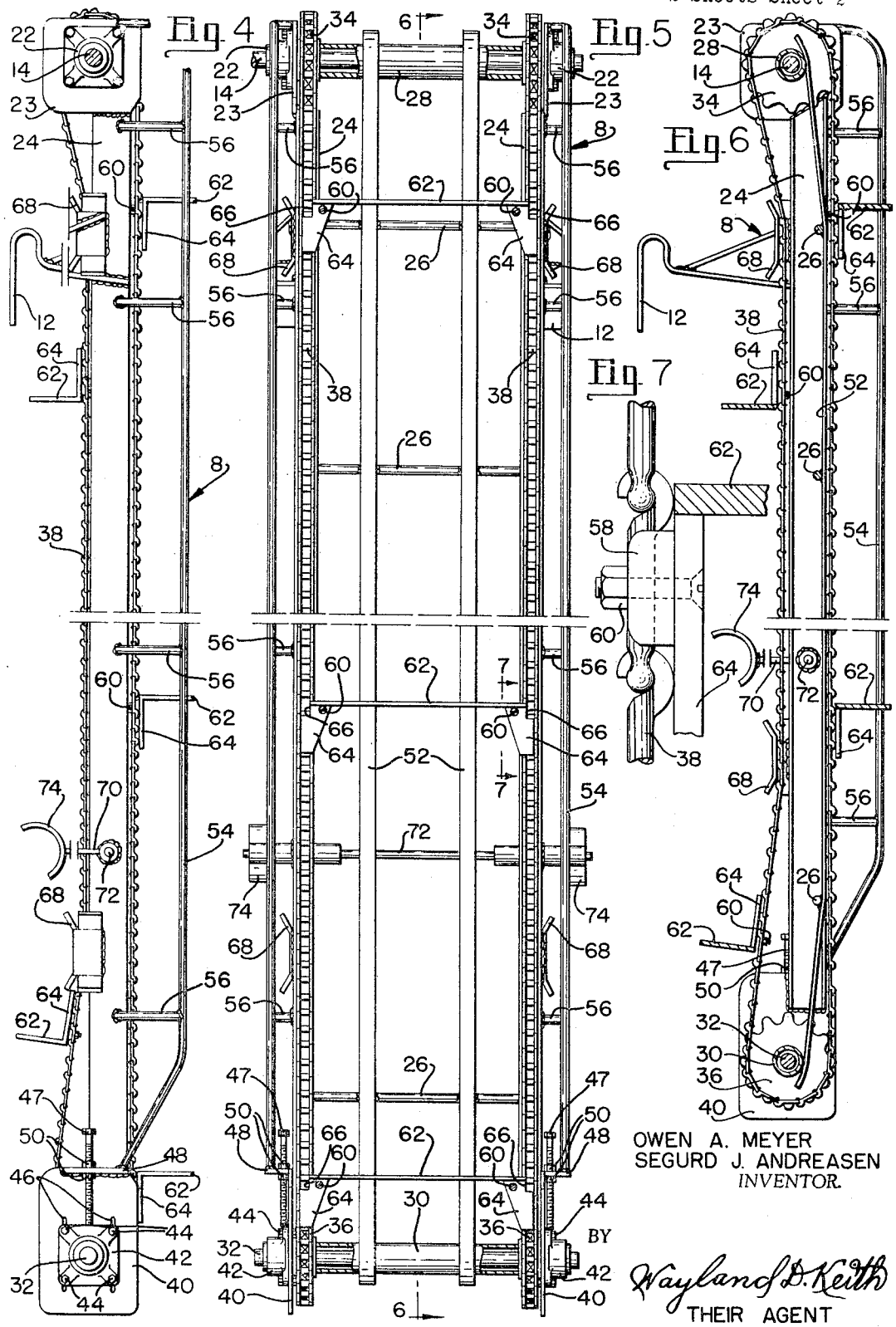

United States Patent Office 3,319,775
Patented May 16, 1967

3,319,775
PORTABLE ELEVATOR CONVEYERS FOR
USE WITH TRUCKS
Sigurd J. Andreasen and Owen A. Meyer, both of
P.O. Drawer 630, Bowie, Tex. 76230
Filed May 14, 1965, Ser. No. 455,711
6 Claims. (Cl. 198—154)

This invention relates to improvements in conveyers and more particularly to portable elevating conveyors for use with a truck for elevating materials from ground level to a point above the bed of the truck.

Some trucks require special bodies, the top of which is twelve or more feet above the ground level, and to load material onto the upper surface of the body without special equipment is very tiresome and time consuming.

The present device embodies an elevating conveyor which may be readily attached to or detached from a truck body, which device is light in weight and easy to handle, and which will readily elevate baled materials, such as baled fiber, for use in a mixing vat or reservoir, which baled fiber is a component element used in hydraulic planting of grass roots, sprigs and various seeds.

Various elevating conveyers have been proposed heretofore, but many of these were built integral with the truck and were only in the way when the truck was used for other purposes.

The present device is so constructed that it may be fitted onto trucks of various makes and with different bed or body constructions, and which may be readily removed, and which is sufficiently light that it may be readily stored on the truck for moving from place to place.

An object of this invention is to provide an elevating conveyor for use on a truck body which will readily elevate products from a lower level to a higher lever with a minimum of machinery.

Another object of the invention is to provide an elevating conveyor which can be "hooked on" a truck body and readily connected to a power drive to elevate products from a lower level to a higher level.

Another object of the invention is to provide an elevating conveyor that may be readily attached to a truck and the drive mechanism of which may be readily engaged and disengaged by the operator working from the upper side of the truck body.

Still another object of the invention is to provide an endless chain operated conveyor elevator which has outstanding platforms thereon to raise a product at a steep angle and to dump the product onto the top of the truck body.

Still another object of the invention is to provide an elevating conveyor with hooks on the side thereof to engage a portion of the truck body and which elevating conveyer has pivoted stand-off arms near the lower end thereof, so as to enable the conveyer to be positioned clear of the truck body.

With these objects in mind and others which will become manifest as the description proceeds, reference is to be had to the accompanying drawings in which like reference characters designate like parts in the several views thereof, in which:

FIG. 1 is a fragmentary, perspective view of a truck showing a body thereon, showing an elevating conveyor attached to the side thereof which is connected in driving relation with the drive mechanism of the unit, and showing bales of material being elevated and dumped onto the top of the truck body;

FIG. 2 is a top plan view of the elevating conveyor with a portion of the drive shaft being broken away, and with other parts being broken away and shortened;

FIG. 3 is a sectional view taken on line 3—3 of FIG. 1, looking in the direction indicated by the arrows and showing a clutch for controlling the elevating conveyor, the clutch being shown in disengaged position;

FIG. 4 is a side elevational view of the elevating conveyor with portions broken away and shortened to bring out the details of construction;

FIG. 5 is a front elevational view of the device with portions broken away and other portions shortened, and with portions being shown in section to bring out the details of construction;

FIG. 6 is a sectional view taken on line 6—6 of FIG. 5, looking in the direction indicated by the arrows, with parts broken away and shortened to bring out the details of construction; and FIG. 7 is a greatly enlarged view of the conveyor chain and an attachment therefor, taken on line 7—7 of FIG. 5, looking in the direction indicated by the arrows.

With more detailed reference to the drawings the numeral 1 designated generally a conventional truck having a frame portion 2 upon which an elevated portion, such as tank 4, is mounted. The tank is shown to have side rails 6 around the top thereof. An elevating conveyor, generally designated by the numeral 8, is shown attached to a horizontal bar 10 by a pair of outstanding hooks 12 at a point near or above the top of tank 4, as will best be seen in FIGS. 1, 4, and 6. These hooks 12 hold a shaft 13, of the elevating conveyor 8, in substantially aligned relation with a power takeoff shaft 16, of the truck, and any misalignment between shafts 14 and 16 is compensated for by universal joints 18, in a manner well understood in the art of transmission shafts. The power take-off shaft 16 is preferably square and receives socket 20 thereover in sliding relation to enable quick connection and quick disconnection thereto and therefrom.

The shaft 14 is journaled in bearings 22, which bearings 22 are secured to plates 23 near the upper end of channel-like frame members 24 of the elevating conveyor 8, which frame members are held in spaced apart relation by bars 26. Tubular members 28 and 30 surround the respective shafts 14 and 32 on the respective upper and lower ends of conveyor 8 and are in bearing relation with pairs of sprockets 34 and 36 to maintain the sprockets in aligned relation, so as to enable the conveyor chains 38 to pass around the respective pairs of sprockets.

Plates 40 are secured to the lower end of channel-like frame members 24 and each has a bearing 42 mounted thereon, which bearings are secured to the respective plates by bolts 44, which bolts pass through the respective bearings and through the respective plates 40, with the bolts 44 being positioned within slotted holes 46 formed in the respective plates 40, to allow for adjusting of the tightness of chain 38 by moving bearings 42, under the influence of screwthreaded elements 47, which screwthreaded elements pass through an outstanding lug 48 on the channels of the frame 24 and are provided with nuts 50 thereon to maintain the screwthreaded element 47 in a fixed relation.

Parallel bars 52 are secured to transverse bars 26 so that material or products being elevated by the conveyor may slide upon parallel bars 52, upon the movement thereof towards the upper end of the elevating conveyor. A rail 54 is provided on each side of the respective channels of frame members 24, which are raised upward therefrom and braced thereto by spaced apart braces 56 so as to prevent lateral movement of material or products being moved upward on elevating conveyor 8. The chain 38 has spaced apart attachments 64 secured thereto as by bolts 60, and each attachment 64 has an outstanding abutment 62 secured thereto, one portion of which extends perpendicularly outward to the longitudinal length of the reaches of chain 38, with a portion of attachment 64 extending downward on the elevating side of the chain as viewed in FIGS. 4, 5, 6, and 7 so as to form an abutment to support products or material being elevated, particularly bales of products such as baled fiber.

The downwardly extending portion of attachment 64 is cut away, as indicated at 66, to permit the attachment 64 to readily travel over sprockets 34 and 36. Each of the reaches of the chain 38 on the outer or elevating side of the conveyer, as viewed in FIGS. 4, 5, and 6, rests upon the respective upper faces of the flanges of the respective channels of frame members 24 and, as the bales of fiber are discharged from the upper end, the chain is brought beneath shoes 68, FIGS. 4 and 5, to maintain the chain in parallel, aligned relation with the inner face of each of the flanges of the respective channels of the frame members 24 and in close proximity thereto, so a minimum of width will be utilized adjacent the truck body and frame. A pair of standout arms 70 are pivotally mounted on transverse shaft 72 a spaced distance upward from the lower end of elevating conveyer 8, which arms have arcuate members 74 thereon to engage the side of the body, frame, or a round pipe 76 such as shown in FIG. 1. By the arms 70 pivoted on shaft 72, the present apparatus may be readily adapted to various types of trucks and bodies without the necessity of having a special elevating conveyer for each type of truck body.

The abutments 62 are positioned at spaced intervals on chain 38 and as the chain moves upward these abutments stand out substantially perpendicular to the outer reach of chain 38 so a bale of products, such as baled fiber 78, may be placed thereupon, whereupon the baled fiber or other product will be discharged off at the upper end of the conveyer, as will best be seen in FIG. 1.

It is preferable that an operator stand on the upper side of tank or body 4 and that a clutch lever 80 may be used to engage a clutch 82 in driving relation with drive sprocket 84; therefore the shaft 16 may be selectively driven by engaging the clutch 82 and by disengaging clutch 82, the sprocket and chain may be thrown out of driving relation, as will best be seen in FIG. 3, which sprocket 84 and chain drive mechanism 86 connects with a prime mover in a conventional manner.

Having thus clearly shown and described the invention, what is claimed as new and desired to be secured by Letters Patent is:

1. A detachable conveyor for a truck which conveyer comprises;
    (a) a pair of spaced apart frame members,
        (1) means positioned between said frame members to rigidly secure said frame members in spaced apart, parallel relation,
    (b) a first shaft passing transversely through said spaced apart parallel frame members and being journaled therein near an end thereof,
    (c) a second shaft passing transversely through said spaced apart parallel frame members and journaled therein near the opposite end of said frame members and being parallel to said first shaft,
    (d) a pair of spaced apart sprockets on each shaft,
        (1) each said sprocket on one shaft being in aligned driving relation with the respective sprockets on the other of said shafts,
        (2) power take-off means connected to a source of power on the truck and with one of said shafts to rotate said shaft and said sprockets,
        (3) an endless chain surrounding said respective pairs of aligned sprockets on said shafts,
            (i) outwardly extending abutments secured to and between said respective chains at spaced intervals, and
    (e) clutch means operatively interposed between the source of power on the truck and one of said shafts of said conveyer to selectively operate said conveyer,
    (f) a support hook mounted on each frame member near the upper end thereof to support said elevating conveyer in a loading position, and
    (g) a brace hingeably secured to said frame members near the lower ends thereof and being adapted to support conveyer in adjusted position with respect to the body of the truck.

2. A detachable elevating conveyer for a truck, which conveyer comprises;
    (a) a pair of spaced apart frame members arranged in rigid, parallel relation,
    (b) a drive shaft passing transversely through said spaced apart, parallel frame members and being journalled therein near one end thereof,
    (c) a driven shaft passing through said spaced apart parallel frame members and being journaled therein near the end thereof opposite said drive shaft,
    (d) a pair of spaced apart sprockets on each said shaft,
        (1) each said sprocket on one shaft being in aligned driving relation with the respective sprockets of the other of said shafts,
        (2) an endless chain surrounding said respective pairs of sprockets on said shafts,
    (e) upstanding abutments associated with each of said endless chains, which abutments are parallel to said shafts,
        (1) each said abutment having an outstanding portion on each end thereof, which abutments are pivotal with respect to said chains,
        (2) each said outstanding portion on each abutment being adapted to rest on a face of the respective chains when a load is mounted on said abutments for movement upward along said conveyer,
    (g) a support hook mounted on each frame member near the upper end thereof to support said elevating conveyer in a loading position,
    (h) a brace hingeably secured to said frame members near the lower ends thereof and being adapted to support said conveyor in adjusted position with respect to the body of the truck,
    (i) power take-off means connected to a source of power on the truck and to said drive shaft, and
    (j) clutch means interposed between said power take-off means and said drive shaft to selectively engage said chains with or disengage said chains from said source of power.

3. A detachable elevating conveyer as defined in claim 2; wherein
    (a) transverse bars extend between said spaced apart parallel frame members, and
    (b) longitudinal bars are secured to the upper face of said transverse bars and are parallel to said spaced apart, parallel frame members to present a support for material being moved upwardly on said conveyor, and
    (c) a side rail secured to each frame member and being parallel thereto and spaced upward therefrom to form guide rails for material being conveyed on said conveyor.

4. A detachable elevating conveyer as defined in claim 2; wherein
    (a) said driven shaft is journaled in said frame members on movable bearings, one on each side of said frame members, and
    (b) screw means secured to each side frame member in bearing relation with the respective bearings, to adjust the tightness of said chains.

5. A detachable conveyer for a truck, which conveyer comprises;
    (a) a pair of spaced apart, channel frame members,
        (1) means positioned between said channel frame members to rigidly secure said frame members in spaced apart, parallel relation, (b) a first shaft passing transversely through said spaced apart, parallel frame members and being journaled therein near an end thereof,
(c) a second shaft passing transversely through said spaced apart, parallel frame members and journaled therein near the opposite end of said frame members and being parallel to said first shaft,
(d) a pair of spaced apart sprockets on each shaft,
  (1) each said sprocket on one shaft being in aligned driving relation with the respective sprockets on the other of said shafts,
  (2) power take-off means connecting a source of power on the truck with one of said shafts to rotate said shaft and said sprockets,
  (3) an endless chain surrounding said respective pairs of aligned sprockets on said shafts,
(e) attachments secured to each of said endless chains,
  (1) each said attachment having a portion thereof cut-away to permit said attachment to pass over said sprockets,
  (2) upstanding abutments attachably secured to said attachments, which abutments are parallel to said shafts,
  (3) each said attachment having a portion thereof extending along a face of each said chain, each end of which attachments are secured to a link of said chain, which link is pivoted with respect to the adjacent links of said chain,
  (4) each said portion of said attachments extending along the respective chains being adapted to rest on at least a portion of the face of the adjacent links on the respective chains, when a load is mounted on said abutments for movement upward along said conveyer,
(f) clutch means operatively interposed between the source of power on the truck and one of said shafts of said conveyer to selectively operate said conveyer.

6. A detachable conveyer for a truck as defined in claim 5, wherein;
(a) a plate is secured to the web of each said channel forming said frame members to enable the sprockets to be in aligned relation with the flanges of said channels.

References Cited by the Examiner

UNITED STATES PATENTS

| | | | |
|---|---|---|---|
| 1,294,591 | 2/1919 | Young | 198—158 |
| 2,562,539 | 7/1951 | Ellis et al. | 214—83.26 X |
| 2,807,351 | 9/1957 | Carlson | 214—83.26 X |

EVON C. BLUNK, *Primary Examiner.*

A. C. HODGSON, *Assistant Examiner.*